United States Patent
Rosow et al.

[19]

[11] Patent Number: 6,139,415
[45] Date of Patent: Oct. 31, 2000

[54] DRIVE SYSTEM FOR SHRIMP PEELING APPARATUS

[75] Inventors: Ben Rosow, New Orleans; Brent A. Ledet, Metairie; Gregory L. Cooper, River Ridge; Scott J. Sirgo, Covington, all of La.

[73] Assignee: The Laitram Corporation, New Orleans, La.

[21] Appl. No.: 09/145,827

[22] Filed: Sep. 2, 1998

[51] Int. Cl.[7] .................................................. A22C 29/02
[52] U.S. Cl. ....................................... 452/5; 452/9
[58] Field of Search ...................... 452/5, 1, 2, 9

[56] References Cited

U.S. PATENT DOCUMENTS

| | | |
|---|---|---|
| 2,429,828 | 10/1947 | Lapeyre et al. . |
| 2,537,355 | 1/1951 | Lapeyre et al. . |
| 2,574,044 | 11/1951 | Lapeyre et al. . |
| 2,637,065 | 5/1953 | Lapeyre et al. . |
| 2,778,055 | 1/1957 | Lapeyre et al. . |
| 3,070,832 | 1/1963 | Lapeyre et al. . |
| 3,383,734 | 5/1968 | Lapeyre . |
| 3,626,551 | 12/1971 | Lapeyre . |
| 3,706,113 | 12/1972 | Lapeyre et al. . |
| 3,740,795 | 6/1973 | Cox . |
| 3,816,877 | 6/1974 | Bullock . |
| 3,971,102 | 7/1976 | Skrmetta . |
| 3,975,797 | 8/1976 | Grimes et al. . |
| 4,400,849 | 8/1983 | Dell . |
| 5,005,258 | 4/1991 | Griffis . |
| 5,108,342 | 4/1992 | Lapeyre et al. . |
| 5,120,265 | 6/1992 | Ledet et al. . |
| 5,346,424 | 9/1994 | Chiu et al. . |

*Primary Examiner*—Willis Little
*Attorney, Agent, or Firm*—Garvey, Smith, Nehrbass & Doody, LLC

[57] ABSTRACT

An improved drive system for a shrimp peeling apparatus includes a support frame with a first and a second plurality of rollers mounted thereon. One of the plurality of rollers have rollers that are of a larger diameter than the other rollers. The drive mechanism includes a computer controlled motor that engages a cylindrically-shaped shaft of each roller and a drive mechanism that engages the cylindrically-shaped end portion. The motor drive can be a computer controlled vector motor that can vary the rotational angular movement of each roller during each stroke. This enables variations in angular rotation and rotational speed depending upon the type and grade of shrimp. This configuration also enables each roller to constantly "advance" by changing the degree of angular rotation of each roller at each stroke, gradually presenting a different wear surface to the shrimp and prolonging roller life.

32 Claims, 12 Drawing Sheets

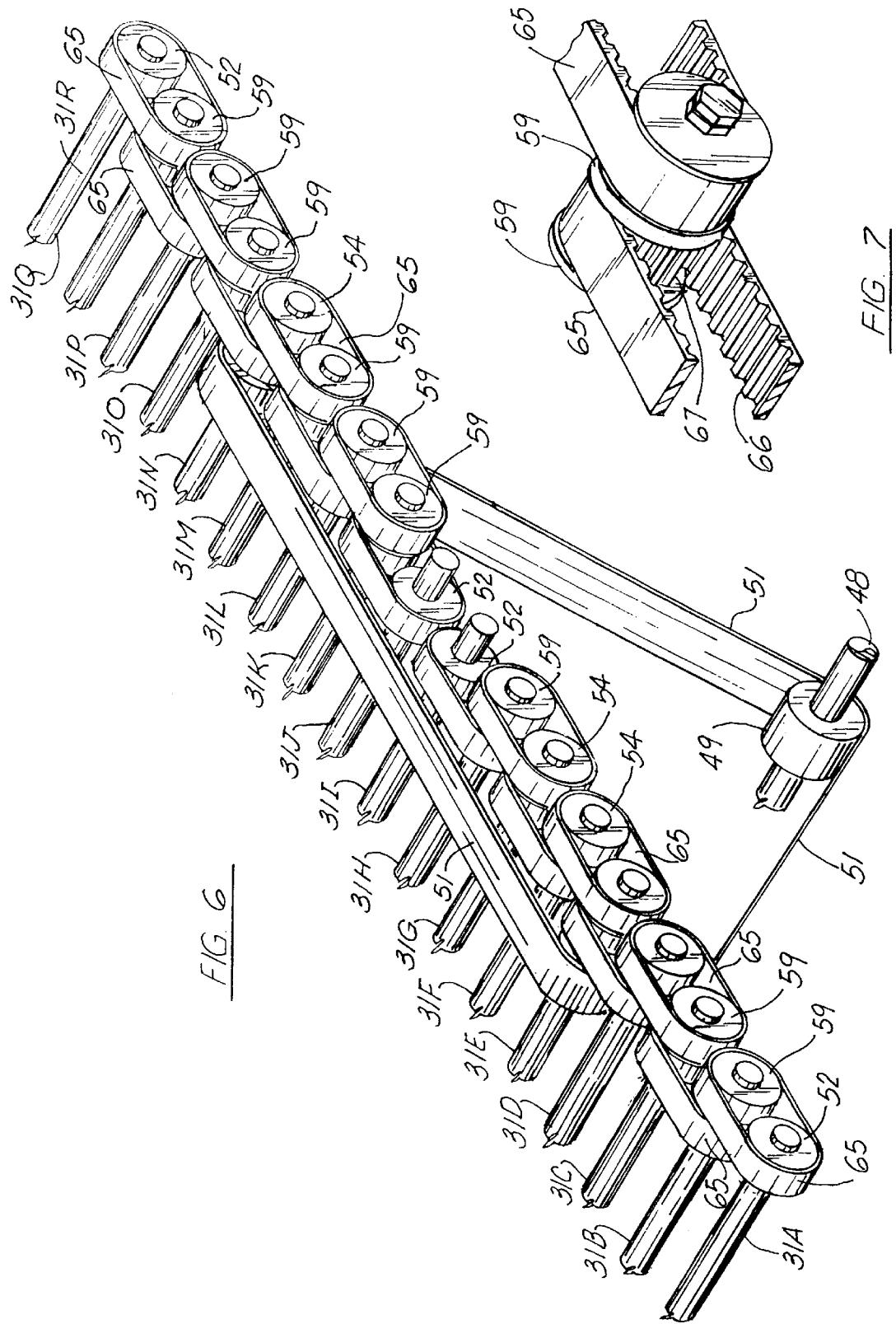

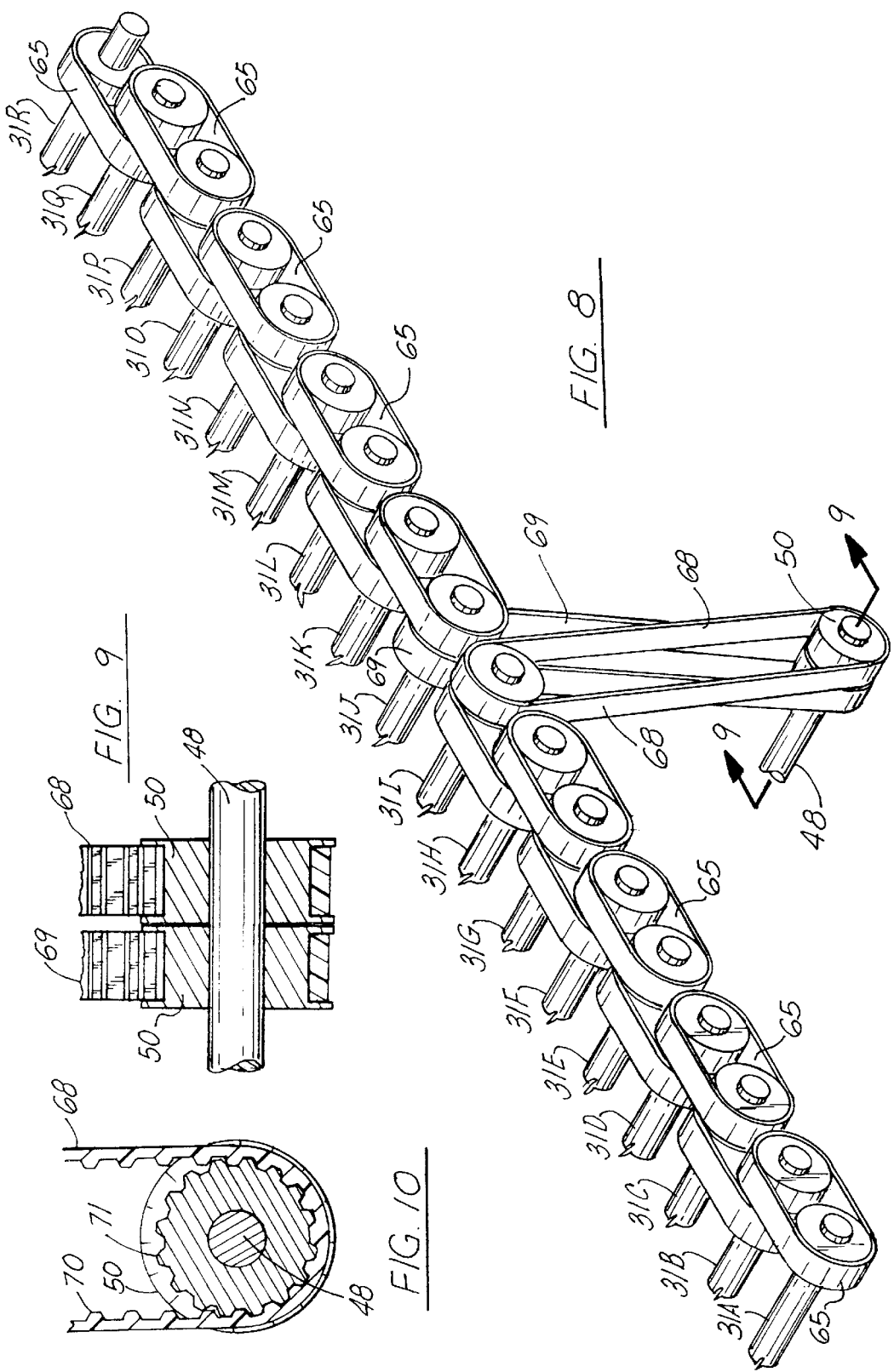

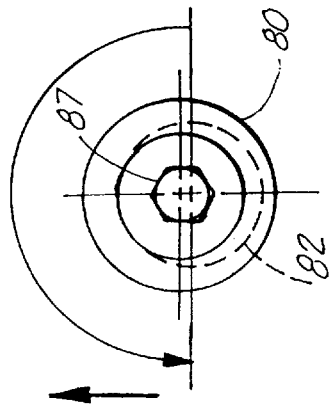
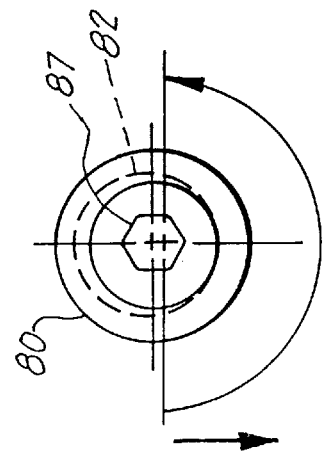
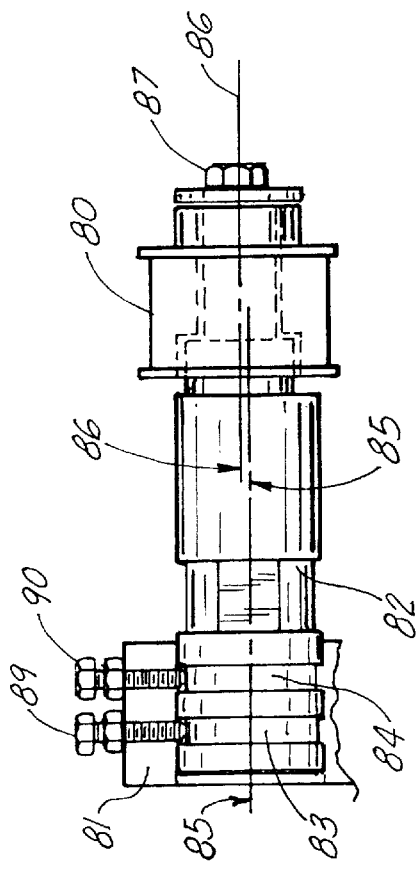
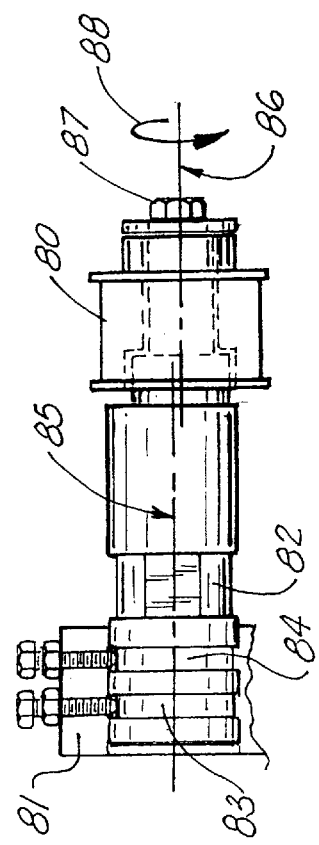
FIG. 18    FIG. 19
FIG. 20    FIG. 21

DRIVE SYSTEM FOR SHRIMP PEELING APPARATUS

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to shrimp peeling devices, and more particularly to a method and apparatus for peeling shrimp that includes alternating larger diameter rollers and smaller diameter insert rollers positioned side-by-side that are driven by a computer controlled motor with a transmission that can be gear or belt type, the motor being computer controlled to enhance efficiency, minimize shrimp damage, and afford flexibility when shrimp vary in size and type and condition.

2. General Background of the Invention

In about 1947, Fernand S. Lapeyre and James M. Lapeyre were faced with the problem of peeling shrimp with a mechanized peeler. The shrimp peeler that they invented made it no longer necessary to rely upon hand labor to sort, peel, or clean shrimp. Early patents that relate to these Lapeyre shrimp peelers include U.S. Pat. Nos. 2,637,065; 2,537,355; 2,574,044; and 2,429,828.

An example of these early patents is the Lapeyre U.S. Pat. No. 2,537,355 entitled "Machine For Peeling Shrimp". The '355 patent discloses a machine for peeling shrimp that includes a channel through which the shrimp are adapted to move comprising a base roller and two spaced channel rollers above and in contact with opposite side portions of the base roller to provide a nip running longitudinally at each side of the channel. Means are provided on the machine to impart an oscillatory motion to the base roller to move the shrimp in the channel from one side nip to the other.

The Lapeyre U.S. Pat. No. 2,778,055 discloses a machine for peeling shrimp that includes a bottom roller on the machine, parallel side rollers on the machine disposed on opposite sides of the bottom roller and spaced therefrom, and elevated therefrom to form a peeling channel with the bottom roller for the shrimp. Insert rollers are operatively associated with the machine and positioned between the bottom and side rollers. A hold down arrangement is provided for the insert rollers that is operatively associated with the bottom and side rollers extending movably down through the spaces between the bottom and side rollers having a resilient connection to the machine. The '055 patent names Fernand Lapeyre, James Lapeyre, and Emile Lapeyre as inventors.

U.S. Pat. No. 3,070,832, entitled "Pressure Finger Loading Device For A Shrimp Peeling Machine", names Fernand S. Lapeyre as inventor. The '832 patent relates to a pressure finger loading device for a shrimp peeling machine and has for an object to provide means for loading differentially or equally and simultaneously all of the pressure fingers carried in a pressure-finger frame such as the pressure finger frame illustrated in U.S. Pat. No. 2,778,055.

An apparatus for peeling pre-cooked shrimp is the subject of U.S. Pat. No. 3,383,734, issued to James M. Lapeyre. The '734 patent includes a first peeling section having members forming peeling nips positioned to receive shrimp hot from a cooker. The first peeling section has pressure means for urging the shrimp into contact with said members forming said peeling nips. A second peeling section is positioned to receive shrimp from the discharge end of the first peeling section. The second peeling section has peeling nips defined by members having different coefficients of friction between themselves and the second peeling section being devoid of any pressure means for urging the shrimp into contact with the members forming the peeling nips. The second peeling section is up to one-half the length the first peeling section.

A drive mechanism for a shrimp peeling machine is disclosed in U.S. Pat. No. 3,626,551, issued to James M. Lapeyre. The '551 patent is directed to driving the peeling rollers of a shrimp peeling machine and the pressure finger frames mounted thereover by a pitman arm actuated bell crank, which rocks on a cam shaft of a pair of cam shafts which raises and lowers the pressure finger frame and simultaneously drives the peeling rollers.

U.S. Pat. No. 3,706,113 provides a shrimp peeling machine that is directed to hold down devices for insert rolls on shrimp peeling machines and embodies an upright member subject to being spring loaded at its base and carrying a cross beam member proximate its top which is retained in a loose fit by a plastic filler material which will permit the cross beam to rock relative to an upright member. Each end of the cross beam member is hooked downwardly to pass through and restrain insert roll hold down straps.

U.S. Pat. No. 3,740,795, issued to James Cox and entitled "Seafood Peeler Using Rollers Of An Endless Conveyor And A Bank Of Inclined Rollers" discloses a machine that peels seafood such as shrimp. The seafood is delivered to rollers. When the contacting surface between the rollers moves downward, they draw the meat through and reject the slippery meat. On the reverse movement of the surfaces, the rejected meat is carried over the second roller to the next.

U.S. Pat. No. 3,816,877, issued to Kenneth Bullock, discloses a shrimp cleaning machine. The '877 patent is directed to cleaning marine life such as shrimp by passing the shrimp down between spaced peeling rolls and having a vertically reciprocating plate therebetween with the rolls on movable centers positioned as a function of the plate shape and position, with the plate having shaped sides with a traveling belt moving over the top edge of the plate for carrying away the cleaned shrimp. The rolls have an outer surface of a predetermined hardness and material rotating at a predetermined speed with the plate vertically reciprocating at a predetermined speed and a spray provided for cleaning the rolls and plate and forcing uncleaned shrimp into the nips between the rolls and plate.

U.S. Pat. No. 3,971,102, issued to Skrmetta, discloses a roller for shrimp peeling machines that include a gapped portion along its length, for example at its upper end, to effectively shorten the effective peeling section of the machine without substantial modification of the basic machine itself by allowing the shrimp to fall through the gapped portion rather than traversing the full length of the roller. The gapped rollers are substituted for the standard peeling rollers which provide peeling action along their full length, when a shorter peeling section is desired. Several different gapped rollers are disclosed, some reversible end-for-end and others forming a series of subsequently related rollers which have a varying location of the gap portion along the roller length.

U.S. Pat. No. 3,975,797, issued to Grames et al. is directed to a shrimp processing apparatus. In the '797 patent, cooked shrimp to be peeled are distributed successively to tiers of sets of peeler rolls and cooperative reciprocative bars The apparatus is said to permit coordinated adjustments of nip spacing and taper angle in the roll-bar tiers independently at corresponding ends of the sets and in each tier independently of the other permit optimum shucking in the first tier and polishing in the second tier suited to type and condition of shrimp. Cams are engaged by cam follower rollers connected to the peeler rolls to control nip distance between the bar and rolls at both ends as a function of relative vertical positioning of each bar and its associated peeler rolls.

The Dell U.S. Pat. No. 4,400,849 discloses a shrimp peeling unit that features a pair of journaled generally horizontal and parallel side-by-side rollers including at least closely adjacent sides defining an elongated upwardly opening "nip" area therebetween. Structure is provided for supplying successive shrimp to be peeled to one end of the "nip" area and drive structure is operatively connected to the rollers for inversely oscillating the latter. The drive structure includes adjustment features operative to adjust the angular extend of oscillation of the rollers, the phase change speed of oscillation of the rollers and the cycle frequency of oscillation of the rollers. Further, a row of fingers are mounted for adjustable speed movement along the "nip" area and are engageable with the shrimp within the "nip" area for urging the shrimp therealong and spray heads are arranged along the "nip" area for directing spray jets of liquid into the "nip" area for assisting in the removal of the shells of the shrimp and also the cleaning of the shrimp being peeled or shelled.

In the Griffis U.S. Pat. No. 5,005,258, a plurality of shucked shellfish are mechanically eviscerated utilizing a series of longitudinally aligned inclined channels, each channel formed of a power-driven roller and adjacent insert rollers. The insert rollers extend generally parallel and longitudinally and are aligned with each other. The frictional surfaces of the rollers and the spacing between the adjacent rollers, or both, are controlled to effectively separate the soft shellfish viscerae from the soft adductor muscle of the shellfish without significant damage to the muscles.

U.S. Pat. No. 5,108,342, issued to George Lapeyre, Brent Ledet, and James E. Saul, Jr., is entitled "High Yield Peeling Means And Method For Uncooked Warm-Water Shrimp". The '342 patent discloses improved machinery and methods for peeling raw, warm-water shrimp to solve the prior art problems of scarring of the shrimp meat and removing of an excess of the edible meat. A critical nip angle of between about 21° and 33° is produced by an insert nip-forming roller having a smaller diameter than conventionally used in the prior art, to considerably improve shrimp appearance while increasing the yield of shrimp meat. Attention is also given to the length and surface configuration of the insert rollers. With at least three axially aligned insert sections, better roller support prevents bowing and lengthens life. Selection of different axially disposed surface configurations permits special-purpose treatment of shrimp. For example, initial removal of waste is expedited by knurled surface sections, and final treatment by smoother sections prevents disfiguration of the peeled shrimp meat.

In the Ledet U.S. Pat. No. 5,120,265, there is disclosed an apparatus and method for improving the yield of peeled shrimp meat obtained with roller-type peeling machinery. In the '265 patent, the yield increase is achieved by means of critical interacting operating relationships in the peeling action between power rollers, intermediate rollers, and insert rollers, expressed in terms of relative roller diameters. Preferred sets of rollers are identified that significantly increase the yields of cold water Pandalus species of shrimp in sizes of 90/kg to 350/kg over conventional commercial rollers. The high throughput quantity of the peelers is not seriously compromised and may be even increased by the ability to provide more peeling channels in a conventional size peeling tray by replacement with smaller diameter power rollers. The preferred roller sets for use in current standard commercial equipment, without other changes, has lower power rollers of 2.5 inch (6.4 cm) diameter, intermediate upper channel forming rollers of 2 inch (5 cm) diameter and insert rollers of 7/16 inch (1.1 cm) diameter. The method of establishing critical roller diameters provided by this invention permits adaption of the feature of obtaining highest yields feasible with critical roller diameter selections for various conditions encountered in the shrimp peeling industry or at a particular peeling site, including product variations from different shrimp catches, sizes, species, etc.

U.S. Pat. No. 5,346,424, issued to Chiu et al., discloses an automatic size-grading and shrimp peeling machine for shrimp. The automatic grading machine includes a plate-partition conveyor mounted to a slanting platform. The slanting platform is mounted with at least three conveying screw shafts coupled with the plate-partition conveyor and a plurality of feeding pipes of peeling machine. The automatic grading machine is mounted on a machine supporting frame so as to have all feeding ports mounted over the peeling machine, which includes at least three peeling units. Each unit includes a large swing peeling roller and two small revolving peeling rollers; a pressing roller and at least one squeezing wheel are mounted between two small revolving peeling rollers. The squeezing wheel and the pressing roller are mounted parallel to each other, but perpendicular to the small revolving peeling rollers.

BRIEF SUMMARY OF THE INVENTION

One of the problems that has always faced shrimp peeling machines is that of increasing yield while minimizing damage to the shrimp. The present invention is directed to an improved shrimp peeling arrangement featuring larger diameter and smaller diameter rollers that are configured with an improved geometry and configuration. This improved geometry and configuration ensures less residence time for the shrimp, and therefore minimized damage. The present invention has particular utility in the peeling of *Pandalus Borealis* variety shrimp.

The present invention provides an improved shrimp peeling apparatus having a frame that supports a plurality of rollers in an inclined orientation. The rollers include a first plurality of rollers supported by the frame and which occupy a common plane. A second plurality of insert rollers is supported by the first plurality of rollers.

The diameter of each of the first plurality of insert rollers is much greater than the diameter of each of the second plurality of rollers. A drive mechanism is provided for rotating the first plurality of rollers in alternating rotational directions, the drive mechanism including a cylindrically-shaped metallic shaft of each larger diameter roller and a drive member that engages said shaft of each larger diameter roller.

The drive member preferably includes a vector drive motor, speed reducer, drive pulley and a flexible belt, the belt forming an interface between the drive member and the plurality of larger diameter rollers. A transmission in the form of multiple smaller belts or multiple gear boxes interfaces the motor drive, motor drive belt and larger diameter rollers.

In one embodiment, the transmission includes multiple clear boxes. In another (preferred) embodiment, the transmission includes a plurality of smaller belts extending between adjacent pairs of larger diameter rollers.

Each of the larger diameter rollers includes a metallic and a non-metallic portion, the non-metallic portion preferably being a polymeric material. The non-metallic portion is preferably a larger diameter section of the larger diameter roller that is used to actually peel the shrimp. The smaller diameter section of the larger diameter roller is preferably a metallic shaft and defines that portion of the larger diameter roller that is driven by the drive mechanism.

The drive motor is preferably a computer controlled vector drive type motor. This arrangement enables the rollers to be driven through variable angular measurements that vary slightly from clockwise rotation to counterclockwise rotation. In this fashion, the wear surface presented to the shrimp can be incrementally rotated so that the rollers wear evenly over a long period of time.

The motor drive and transmission configuration of the present invention enable a user to vary the angular stroke length and the speed of rotation to optimize peeling conditions when shrimp vary in size, species, age and condition.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 6 is a fragmentary perspective view of the preferred embodiment of the apparatus of the present invention illustrating the preferred belt and multiple sheave type transmission;

FIG. 7 is a fragmentary perspective view of the preferred embodiment of the apparatus of the present invention illustrating the connection between belts and sheaves on a roller shaft;

FIG. 8 is a fragmentary perspective view of the preferred embodiment of the apparatus of the present invention illustrating the preferred belt and multiple sheave type transmission with a different belt configuration;

FIG. 9 is a sectional view taken along lines 9—9 of FIG. 8;

FIG. 10 is a fragmentary end view of the preferred embodiment of the apparatus of the present invention illustrating the connection between a belt and sheave;

FIGS. 18–19 are side end views of an eccentric belt tensioner used with the transmission of FIG. 17, and shown rotated upwardly; and FIGS. 20–21 are side end views of an eccentric belt tensioner used with the transmission of FIG. 17, and shown rotated downwardly.

DETAILED DESCRIPTION OF THE INVENTION

Figure 1:
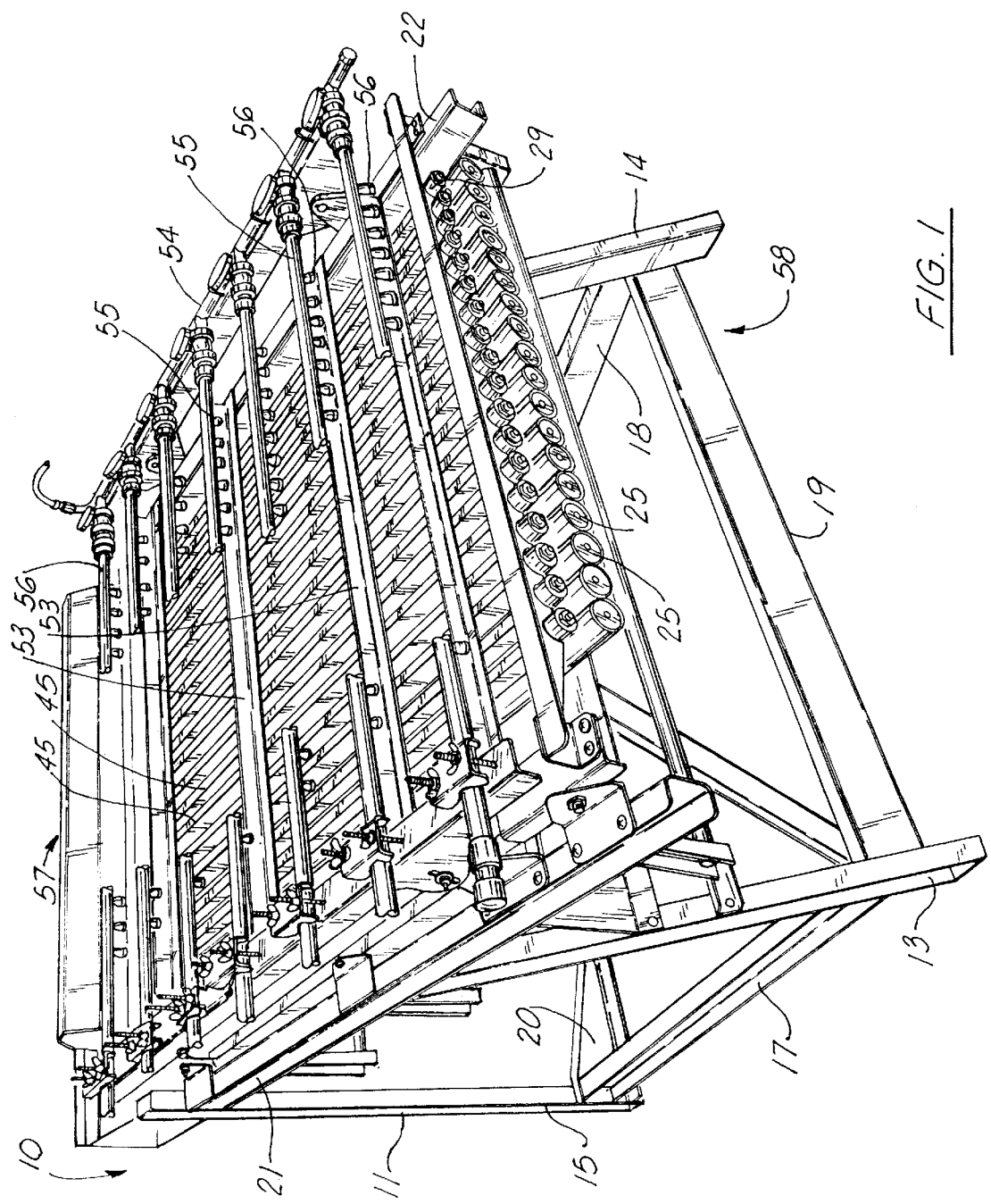
FIG. 1 is a perspective view of the preferred embodiment of the apparatus of the present invention.
Figure 2:
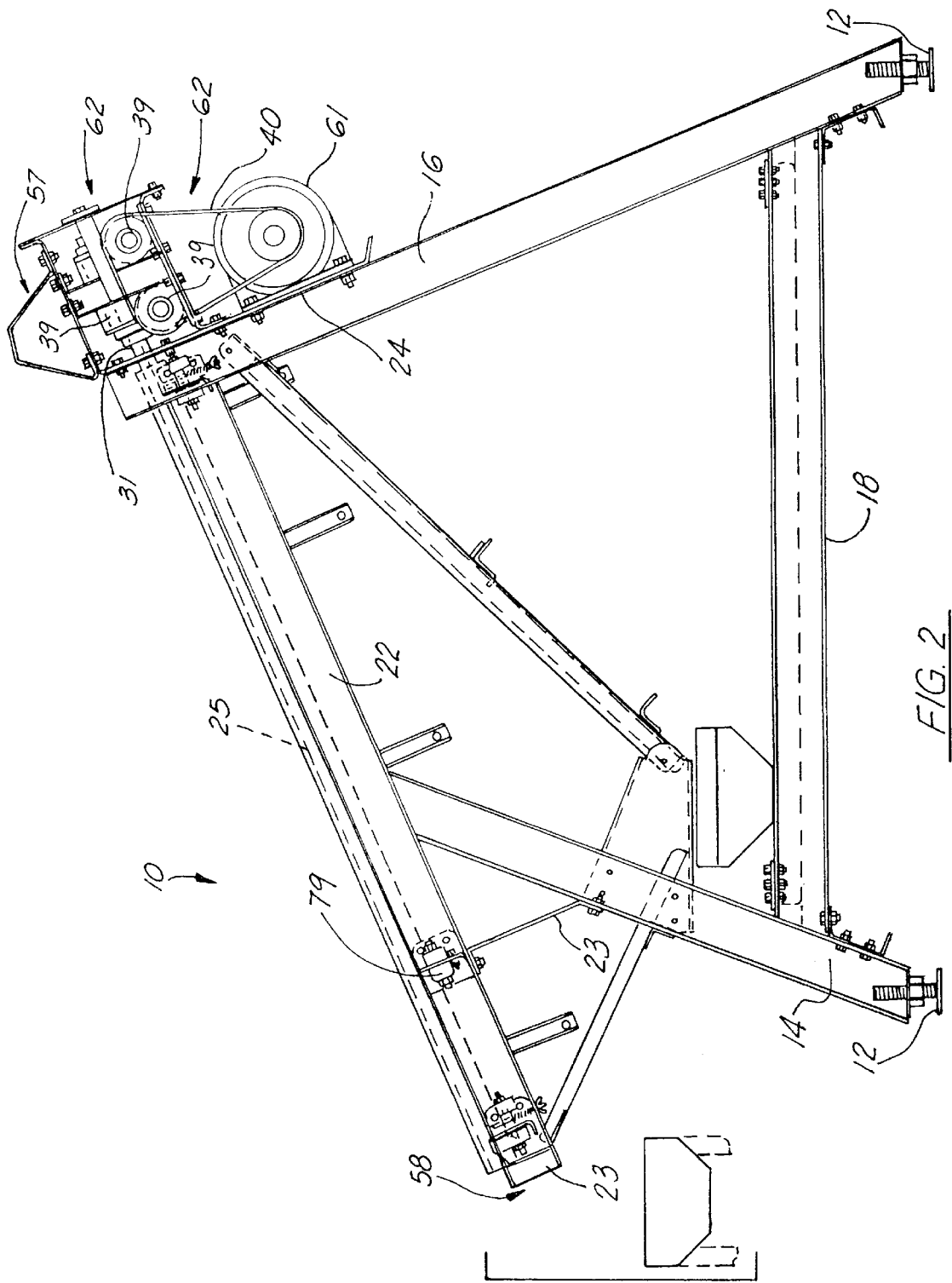
FIG. 2 is a side elevational view of the preferred embodiment of the apparatus of the present invention.

FIGS. 1–2 show generally the preferred embodiment of the apparatus of the present invention designated generally by the numeral 10. Shrimp peeler apparatus 10 includes a frame 11 having a plurality of supporting feet 12 attached to diagonally extending supporting legs 13, 14, 15, 16. Horizontal beams 17, 18 extend respectively between the front legs 13, 14 and the rear legs 15, 16. Horizontal beam 19 extends between front legs 13 and 14, horizontal beam 20 extends between rear legs 15, 16.

Frame 11 includes an upper frame portion for holding a plurality of rollers 25, 26 in generally parallel relationship. Frame 11 can thus have upper inclined beam sections 21, 22 and transverse plate sections 23, 24 that are spaced across the upper portion of frame 11. Transverse plate sections 23, 24 support a plurality of rollers including larger diameter rollers 25 and smaller diameter insert rollers 26. Idler rollers 29 attached to the frame support the larger diameter rollers 25 across the width of the peeler. The smaller insert rollers 26 are held in position with hold down rollers 27. Hold down rollers 27 engage the bottom of two adjacent larger diameter rollers 25 as shown in FIG. 15.

Figure 15:
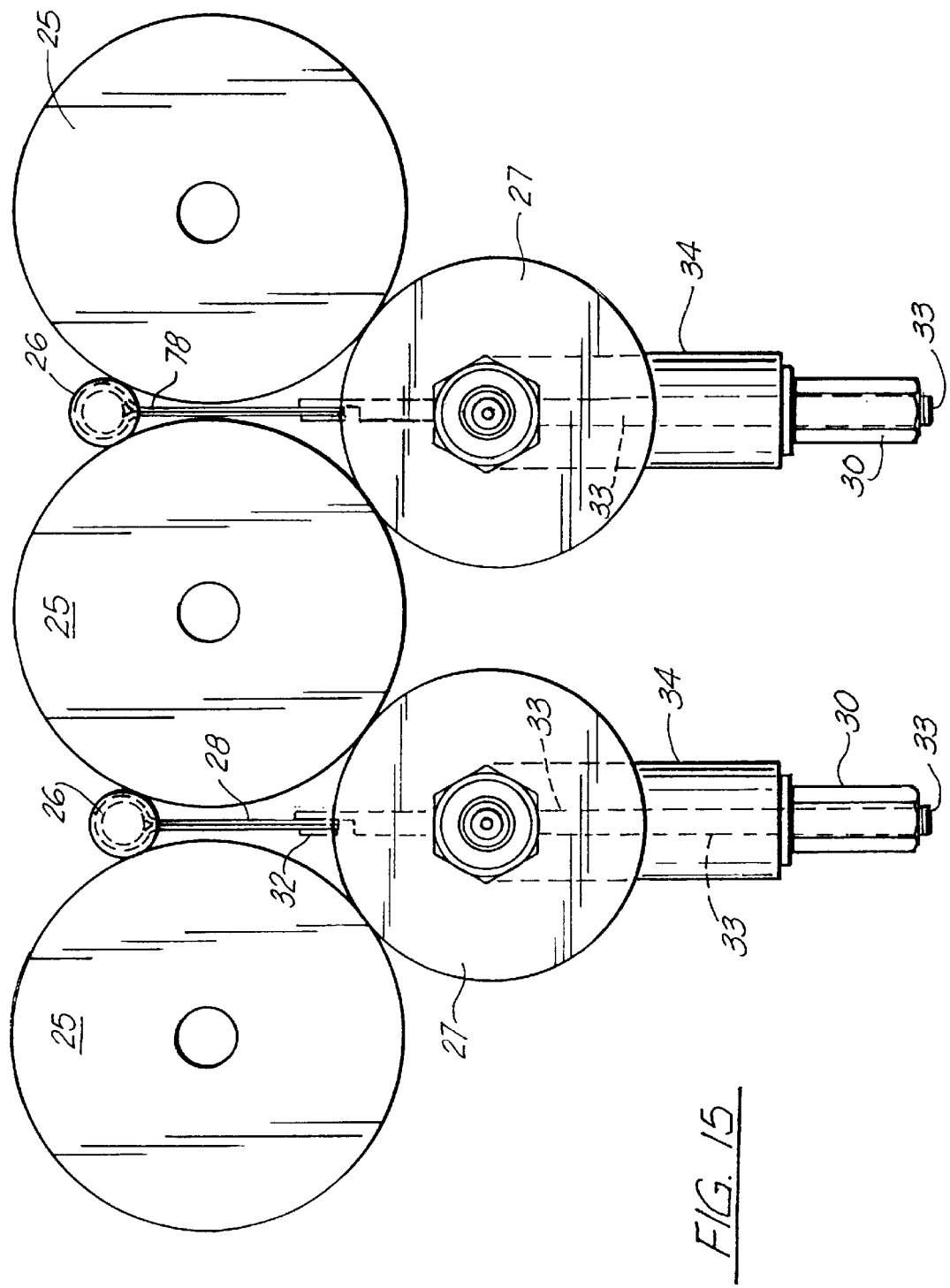
FIG. 15 is a schematic end view of the preferred embodiment of the apparatus of the present invention showing the roller hold down assemblies.

In FIG. 15, a hold down roller 27 can be provided for holding the smaller diameter roller 26 tightly against two adjacent larger diameter rollers 25. The hold down roller 27 includes hold down member 78 in the form of a strap 28 that forms a removable connection with threaded shaft 33. Shaft 33 carries polymeric sleeve 34 and adjustment nut 30. The nut 30 can be adjustably rotated relative to the shaft 33 to increase or decrease pressure between the smaller diameter 26 and larger diameter rollers 25. Hold down devices can be seen more particularly in U.S. patent application Ser. No. 09/145,693, filed on even date herewith, and entitled "Shrimp Peeling Apparatus Roller Hold Down Assembly", which is incorporated herein by reference. The insert rollers 26 are held with strap 28 to which tension can be applied with polymeric sleeve 34 using adjustment nut 30 that threadably engages threaded shaft 33. A connection is formed at 32 between strap 28 and threaded shaft 33 to tighten sleeve 34 against a roller barrel that carries rollers 27.

Figure 4:
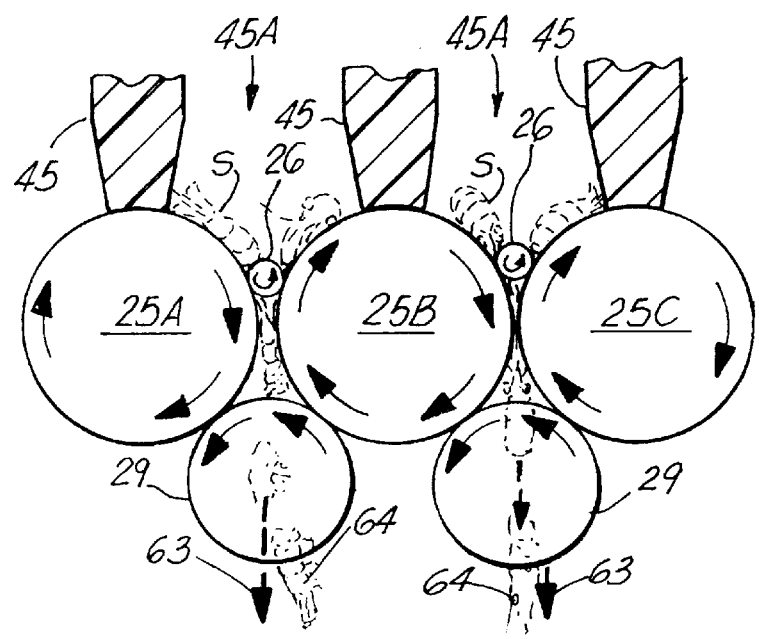
FIG. 4 is a schematic end view of the roller geometry illustrating the large rollers, small insert rollers, idler rollers and dividers.
Figure 16:
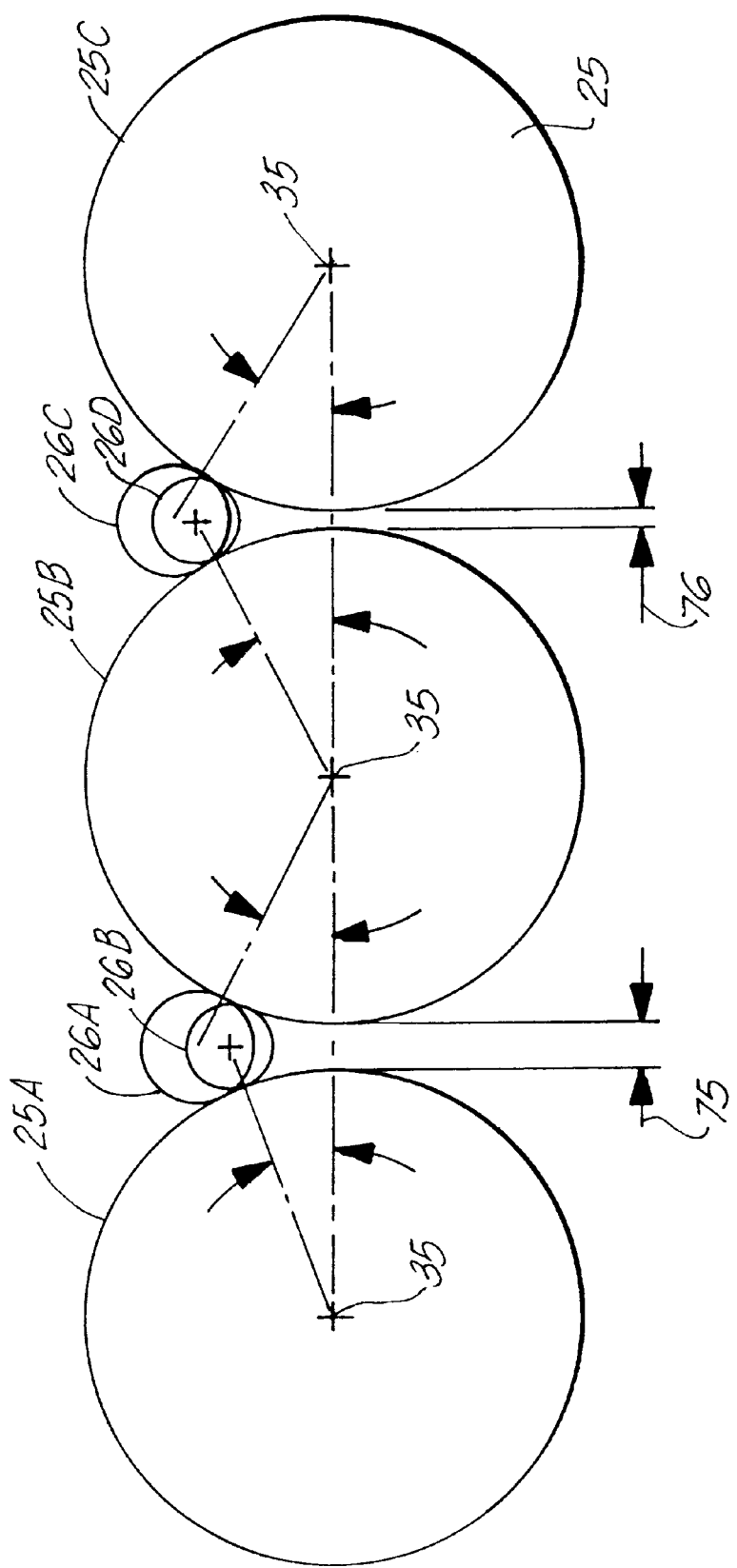
FIG. 16 is a schematic end view of the preferred embodiment of the apparatus of the present invention showing the roller geometry.
Figure 17:
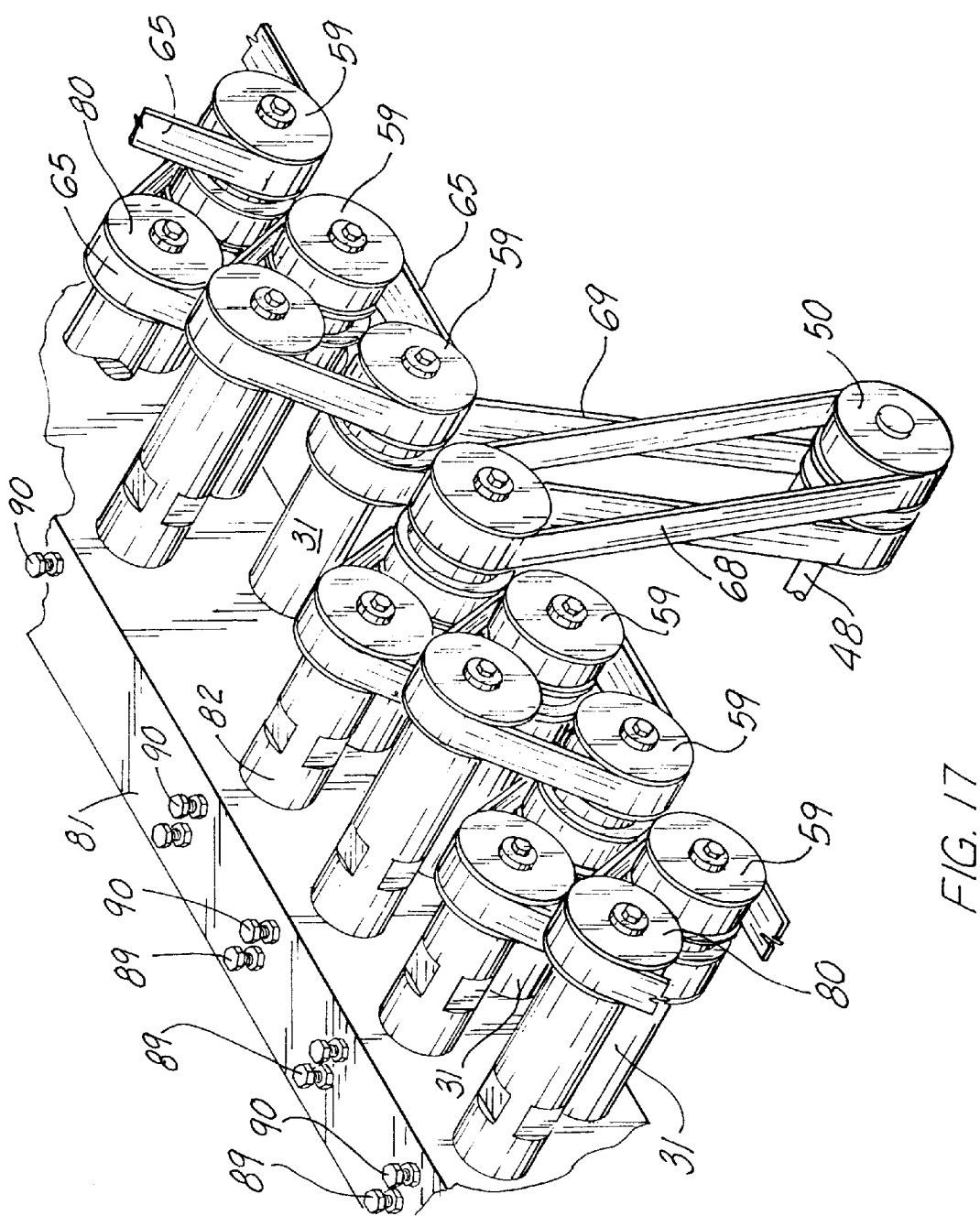
FIG. 17 is a fragmentary perspective view of the preferred embodiment of the apparatus of the present invention illustrating an alternative transmission using a tensioner arrangement.

In FIGS. 4 and 16, an improved geometry is shown for defining the relative positions between the larger diameter rollers 25 and the smaller diameter insert rollers 26. In FIG. 16, the center of rotation of larger diameter rollers 25 is indicated by the numeral 35. In FIG. 16, there are three larger diameter rollers 25A, 25B, 25C shown for purposes of illustration, and two pairs of different smaller diameter insert rollers 26A, 26C and 26B, 26D. Either pair of the insert rollers 26A, 26C, 26B, 26D could be selected, the nip angle varying with the change in diameter between rollers 26A, 26C and 26B, 26D. The insert rollers 26A, 26C are thus larger in diameter than the insert rollers 26B, 26D. Both pairs of the smaller diameter insert rollers 26A, 26B, 26C, 26D are much smaller in diameter than the larger diameter roller 25 as shown. The spacings 75, 76 between the large diameter rollers can also be used to adjust the nip angles.

In FIG. 4, there can be seen dividers 45, each extending longitudinally along the top of a larger diameter roller 25. Each divider 45 provides a concave surface that is of a curvature that conforms to the outer surface of its respective larger diameter roller 25 as shown in FIG. 4. Dividers 45 can be attached (e.g., bolted) to transversely extending supports 53 of frame 11. A pair of adjacent dividers 45 form a channel 45A therebetween that retains shrimp S to be peeled in a space that extends from one larger diameter roller such as 25A in FIG. 4 to the adjacent larger diameter roller such as the roller 25B in FIG. 4. In such situation, peeling of the shrimp S in between two adjacent dividers 45 is accomplished by a single smaller diameter insert roller 26 and the two adjacent larger diameter rollers 25A, 25B. the dividers 45 prevent shrimp from traveling laterally from a roller such as 25A to a roller 25B and then to roller 25C.

Water can be supplied to rollers 25, 26 at a position in between adjacent dividers 45. In FIG. 1, a water supply header 54 carries water to a plurality of transversely extending conduits 55. Each of the conduits 55 carries a plurality of spray heads 56, preferably of the same number as there are smaller diameter rollers 26. The spray nozzle 56 can also be provided in multiple rows shown in FIG. 1, spaced at intervals from the input end 57 to the output end 58 of the apparatus 10. Spray nozzle 56 preferably spray a fan type spray pattern that extends longitudinally in the direction of smaller diameter rollers 26. The fan spray from each of the nozzles 56 can be varied in intensity and flow rate to control the travel speed of the shrimp from input end 57 to output end 58.

During use, shrimp S are input to the apparatus 10 at its upper end portion 57. The shrimp S then travel downwardly in channels 45A and on rollers 25, 26 toward output end portion 58. During use, rollers 25 rotate in opposite rotational direction as indicated schematically by the curved arrows in FIGS. 4 and 14. This rotation can be computer controlled with a vector drive motor 61 mounted on frame 11 and having a transmission 62 (see FIG. 3) that forms an interface between motor drive 61 and the plurality of larger diameter rollers 25.

In FIG. 4, the individual shrimp S are shown in position above the interface formed by smaller diameter rollers 26 and larger diameter rollers 25A, 25B, 25C. The shell 64 of the shrimp is pinched by the nip formed between each smaller diameter roller 26 and an adjacent larger diameter roller 25A or 25B. In FIG. 4, the peeled shell of a shrimp S is indicated by the numeral 64 as falling below the larger diameter rollers 25, the travel path of the shrimp peel being indicated schematically by the arrow 63 in FIG. 4.

Figure 11:
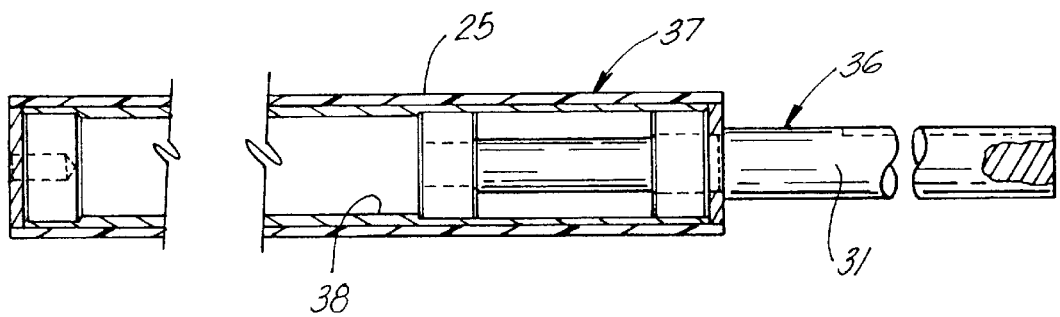
FIG. 11 is a partial sectional elevational view of a larger diameter drive roller.
Figure 12:
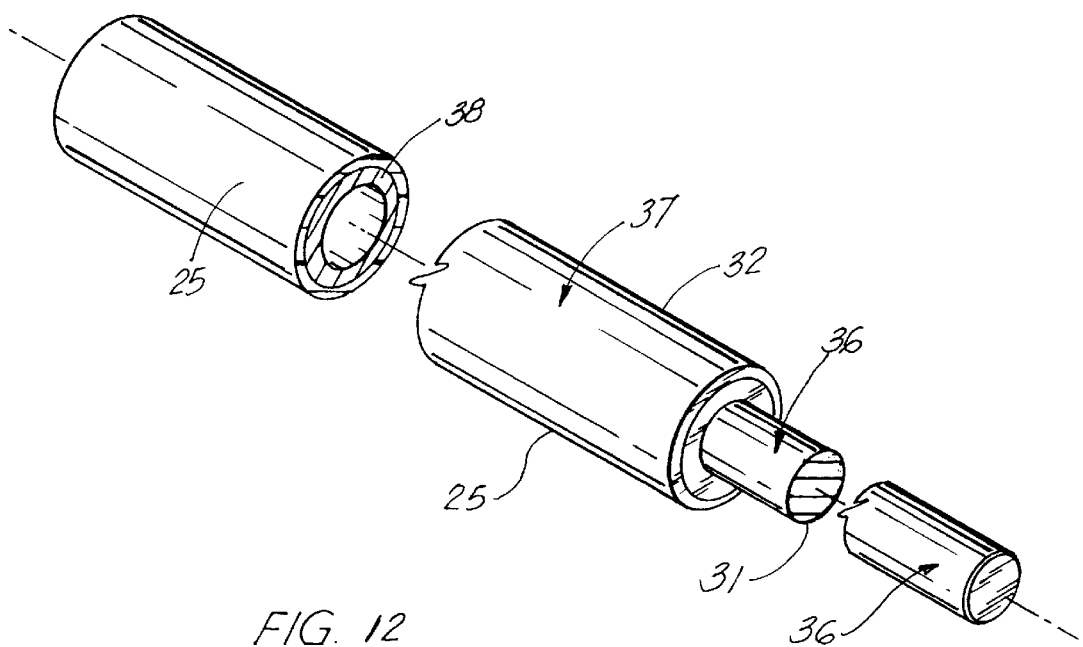
FIG. 12 is a perspective view of a larger diameter drive roller for use with the preferred embodiment of the apparatus of the present invention.
Figure 13:
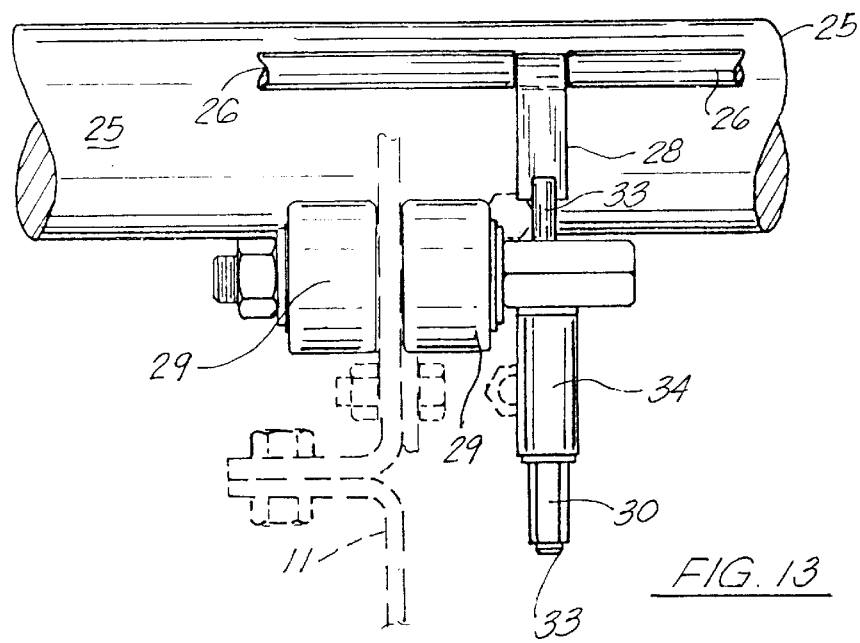
FIG. 13 is a fragmentary side elevational view of the preferred embodiment of the apparatus of the present invention illustrating the large and small drive rollers, idlers, and hold down portions thereof.

In FIGS. 2 and 11–13, the particular construction of larger diameter roller 25 is shown. Each larger diameter roller 25 includes a smaller diameter shaft section 31 that is preferably metallic (for example, stainless steel) and a larger diameter section 32 that is covered with a non-metallic polymeric material. Polymeric outer surface 37 in FIG. 11 peels the shrimp S in combination with smaller insert roller 26, typically stainless steel. The polymeric outer surface 37 can be in the form of a sleeve that covers a metallic core 38 as shown in FIGS. 11 and 12.

Figure 14:
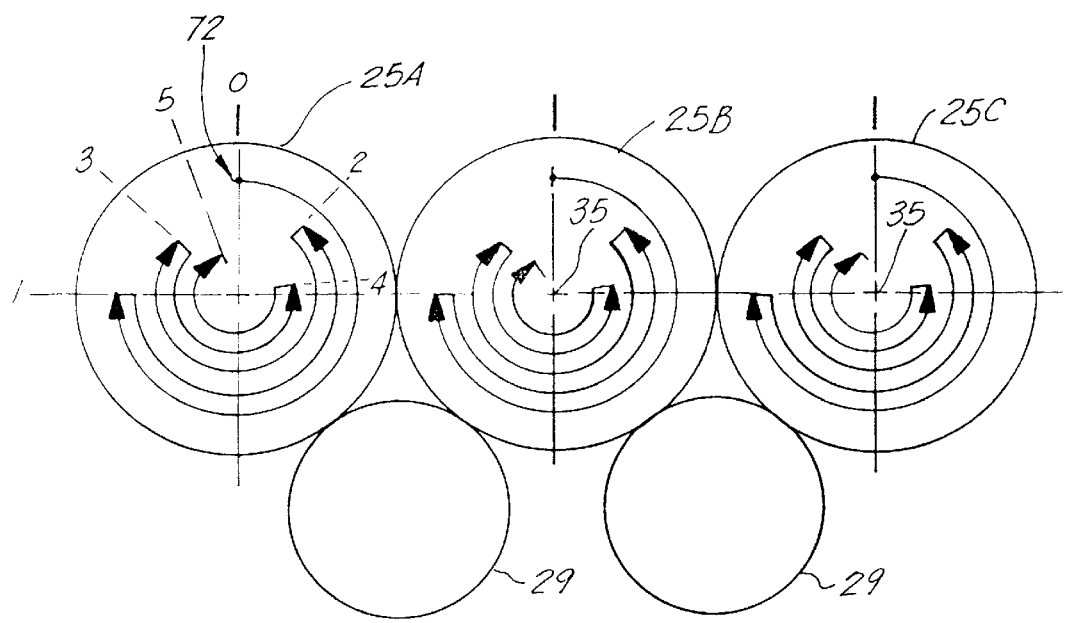
FIG. 14 is a schematic end view of the preferred embodiment of the apparatus of the present invention illustrating roller rotation through variable angular measurements during use.

The shaft 31 of each larger diameter roller 25 provides a metallic outer surface 36 that is gripped by a transmission 62 driven by motor drive 61. The motor drive 61 is computer controlled so that the larger diameter rollers 25 can be incrementally rotated through differing rotational angles to gradually provide a different wear surface 37 to the shrimp S, thus ensuring even wear patterns to surfaces 37 of roller 25 over a long period of time. This computer controlled variable rotational pattern is illustrated in FIG. 14. The rollers 25A, 25B, 25C rotate one rotational measure on clockwise strokes and a different rotational measure on counterclockwise strokes. The drive member 61 rotates each roller through an angular measurement that varies from clockwise to counterclockwise rotation, enabling each roller to advance over time. The motor drive 61 thus enables roller rotational direction to reverse during a cyclical rotation of the rollers. The clockwise and counterclockwise rotation differs between 1 and 20 degrees.

Roller 25A first rotates a desired degree value (e.g., about 270°), a beginning reference point designated as numeral 72, and finishing rotation with the reference point being at position 1. The next rotation is in the opposite direction a selected measure (e.g., 260°) to position "2". The next rotation is (e.g. 270°) to position 3. The following rotation is a selected measure (e.g., 260°) to position "4". The last rotation is a selected measure (e.g., 270°) to position "5". In this example, the clockwise and counterclockwise rotations differ by 10° (270°–260°), but can be varied using a computer to control the vector drive motor 61. A referred range of variation to achieve effective peeling and even roller wear is a difference between clockwise and counterclockwise rotations of between about 0.25° and 20°.

Figure 3:
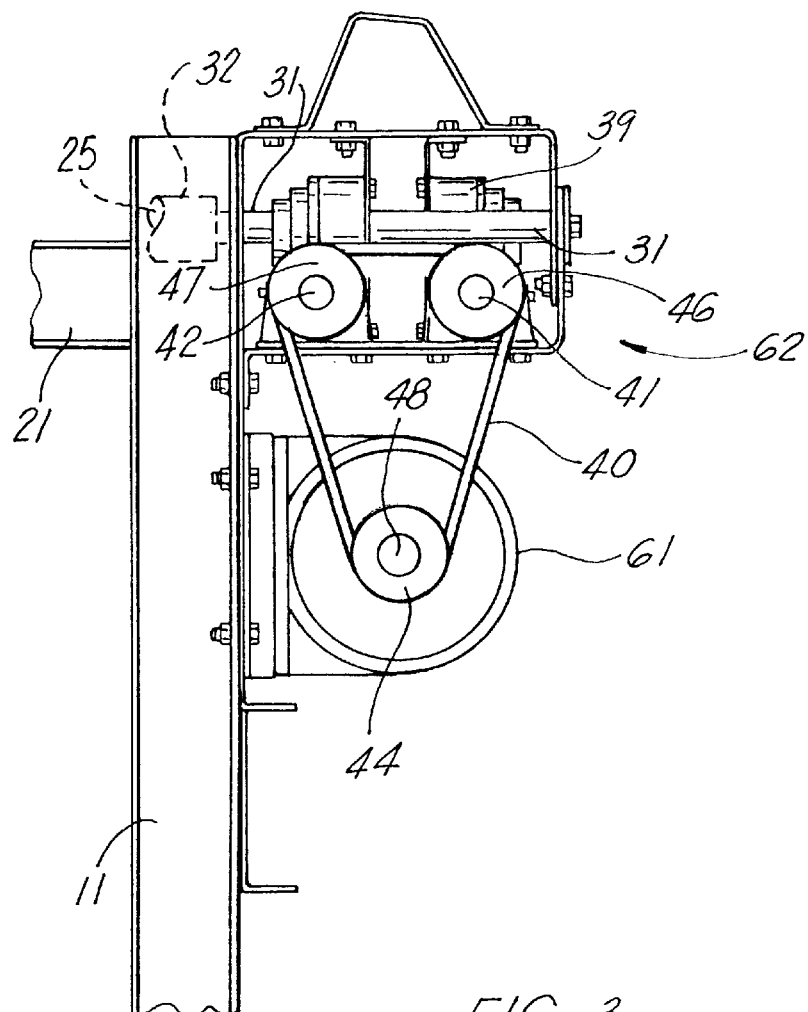
FIG. 3 is a fragmentary transverse elevational view of the preferred embodiment of the apparatus of the present invention illustrating one version of a motor drive and transmission portion thereof.
Figure 5:
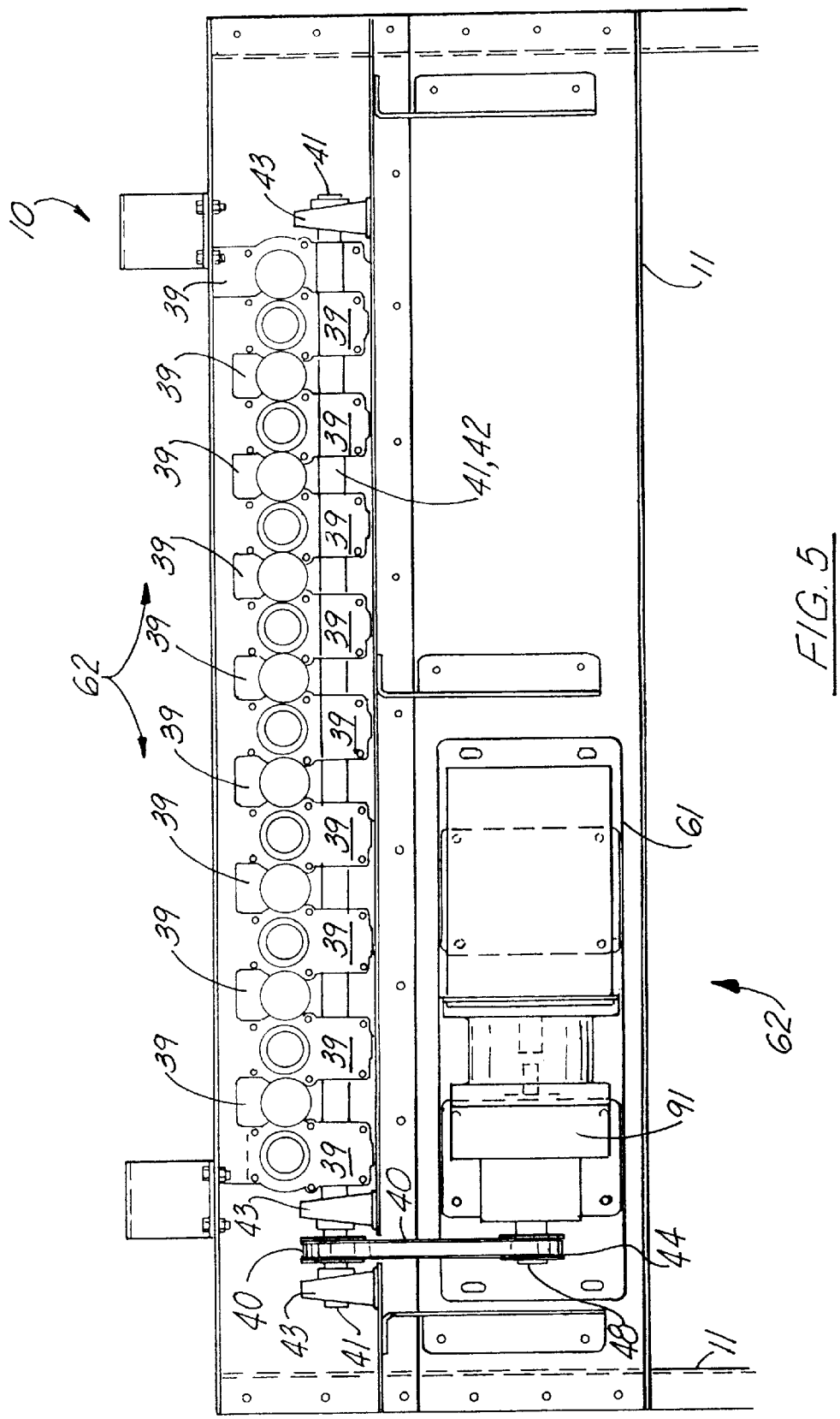
FIG. 5 is a fragmentary end elevation view of the preferred embodiment of the apparatus of the present invention showing a transmission portion thereof.

Motor drive 61 can operate with different transmissions. These can include the gear box transmission 62 of FIGS. 2 and 5 or the belt transmission of FIGS. 7–10, the latter being the preferred embodiment. Speed reducers 91 can be positioned in between motor drive 61 and the transmission 62. In FIG. 5, the transmission 62 is in the form of a plurality of right angle gear boxes 39. These gear boxes 39 are driven by motor drive 61 using belt 40. A pair of shafts 41, 42 engage belt 40 and also first and second pluralities of the respective gear boxes 39. To fit in the allotted space, the gear boxes 39 are staggered as shown in FIGS. 3 and 5. The belt 40 driven by motor 61 rotates the rollers 25 in alternating clockwise and counterclockwise rotational directions as shown in FIGS. 4 and 14. Bearings 43 can be used to support the shafts 41, 42. Sheave 44 attaches to motor drive shaft 48. Sheaves 46, 47 are provided on the ends respectively of shafts 41, 42 as shown in FIG. 3.

In FIGS. 6–10, a belt drive arrangement is shown in two forms. Each form includes a drive shaft 48 of motor drive 61 that drives a sheave. The sheave then drives an elongated, longer belt that is coupled to sheaves on the individual roller shafts 31 of the larger diameter rollers 25. In FIG. 6, a sheave 49 is driven by shaft 48. The sheave 49 drives belt 51. In the arrangement of FIGS. 6 and 7, each of the roller shafts 31 of the plurality of larger diameter rollers 25 has a sheave that receives a belt. In FIG. 6, some of the roller shaft sections 31 of larger diameter rollers 25 have more than one sheave.

In FIG. 6, the roller shafts 31 of larger diameter rollers 25 have been labeled 31A–31R. The smaller diameter drive portions 31A, 31I, 31J, and 31R have one sheave 52. A double sheave 59 is provided on the roller shafts 31B, 31C, 31E, 31F, 31G, 31H, 31K, 31L, 31M, 31O, 31P, 31Q. A triple sheave 60 is provided on smaller diameter shaft portions 31D and 31N. The triple sheaves 60 are engaged by drive belt 51 that is also driven by sheave 49 of motor drive 61, and its drive shaft 48. In the embodiment of FIG. 6, small belts 65 are provided for spanning in between two adjacent shaft end portions 31. Each belt 65 can be a timing belt that has teeth 66 that cooperate with correspondingly-shaped teeth 67 of a timing pulley 52, 59, or 60. Alternatively, the belt 65 could be a v-belt that engages sheaves.

In FIGS. 8–10, a similar belt drive arrangement is provided to that shown in FIGS. 6–7. In the embodiment of FIG. 8, a double sheave 50 is driven by motor drive 61 shaft 48. Two belts 68, 69 are driven by motor drive shaft 48, each belt engaging a single sheave of a shaft end portion 31I, 31J. In FIGS. 9 and 10, the sheave 50 provides teeth 71 that cooperate with correspondingly-shaped teeth 70 on belts 68, 69.

In FIGS. 17–21, an alternate version of the belt drive arrangement is shown wherein a separate tension pulley 80 is used with double sheaves 59 to apply tension to small belt 65. Motor drive shaft 48 drives double sheave 50 and belts 68,69 as with the transmission shown in FIG. 8. A mounting block 81 holds a plurality of eccentric belt tensioners 82, each having a tension pulley 80. At mounting block 81, tensioners 82 are held by set screws 89, 90 that engage annular grooves 83, 84 at the inner end of tensioner 82.

Tensioner 82 has an inner section 82A with central longitudinal axis 85 and an outer section with central longitudinal axis 86. The axis 86 is offset from the axis 85 so that when shaft 82 is rotated relative to mounting block 81 the axis 86 rotates about axis 85. Likewise, pulley 80 rotates from a lower position (FIG. 21) to a higher position (FIG. 19) so that belt 65 is tightened.

The following table lists the parts numbers and parts descriptions as used herein and in the drawings attached hereto.

PARTS LIST

| Part Number | Description |
| --- | --- |
| 10 | shrimp peeler apparatus |
| 11 | frame |
| 12 | feet |
| 13 | leg |
| 14 | leg |
| 15 | leg |
| 16 | leg |
| 17 | horizontal beam |
| 18 | horizontal beam |
| 19 | horizontal beam |
| 20 | horizontal beam |
| 21 | inclined beam section |
| 22 | inclined beam section |
| 23 | transverse beam |
| 24 | transverse beam |
| 25 | larger diameter roller |
| 25A | larger diameter roller |
| 25B | larger diameter roller |
| 25C | larger diameter roller |
| 26 | smaller diameter roller |
| 26A | smaller diameter roller |
| 26B | smaller diameter roller |

-continued

PARTS LIST

| Part Number | Description |
| --- | --- |
| 26C | smaller diameter roller |
| 26D | smaller diameter roller |
| 27 | roller |
| 28 | strap |
| 29 | support idler roller |
| 30 | adjustment nut |
| 31 | roller shaft |
| 32 | larger diameter section |
| 33 | shaft |
| 34 | polymeric sleeve |
| 35 | center of rotation |
| 36 | metallic outer surface |
| 37 | polymeric outer surface |
| 38 | metallic core |
| 39 | gear box |
| 40 | belt |
| 41 | drive shaft |
| 42 | drive shaft |
| 43 | bearing |
| 44 | sheave |
| 45 | dividers |
| 46 | sheave |
| 47 | sheave |
| 48 | motor drive shaft |
| 49 | sheave |
| 50 | sheave |
| 51 | belt |
| 52 | sheave |
| 53 | transverse support |
| 54 | water supply header |
| 55 | transverse conduit |
| 56 | spray nozzle |
| 57 | input end |
| 58 | output end |
| 59 | double sheave |
| 60 | triple sheave |
| 61 | motor |
| 62 | transmission |
| 63 | arrow |
| 64 | peeled shrimp shell |
| 65 | belt |
| 66 | teeth |
| 67 | teeth |
| 68 | belt |
| 69 | belt |
| 70 | teeth |
| 71 | teeth |
| 72 | reference point |
| 75 | gap |
| 76 | gap |
| 78 | hold down member |
| 80 | tensioner pulley |
| 81 | mounting block |
| 82 | eccentric belt tensioner |
| 83 | groove |
| 84 | groove |
| 85 | axis |
| 86 | axis |
| 87 | hexagonal fitting |
| 88 | curved arrow |
| 89 | set screw |
| 90 | set screw |
| 91 | speed reducer |
| S | shrimp |

The foregoing embodiments are presented by way of example only; the scope of the present invention is to be limited only by the following claims.

What is claimed is:

1. A shrimp peeling apparatus comprising:
   a) a support frame;
   b) a first plurality of rollers supported by the frame, wherein the central longitudinal axis of each said roller of said first plurality lies in a common inclined plane;

c) a second plurality of insert rollers supported by the first plurality of rollers;

d) wherein the diameter of each of the first plurality of rollers is much greater than the diameter of each of the second plurality of insert rollers;

e) a drive mechanism for rotating the first plurality of rollers in alternating rotational directions; and f) wherein the drive mechanism includes a cylindrically-shaped metallic shaft of each roller of said first plurality of rollers with a cylindrically shaped, smooth, gearless outer surface and a drive member that engages said shaft at said smooth surface.

2. The shrimp peeling apparatus of claim 1 wherein the drive member includes a flexible main drive belt.

3. The shrimp peeling apparatus of claim 1 wherein the drive member includes a plurality of gear boxes.

4. The shrimp peeling apparatus of claim 1 wherein the drive member includes a vector drive motor.

5. The shrimp peeling apparatus of claim 1 wherein the drive member is a motor drive and there are a plurality of belts extending between adjacent pairs of the larger diameter rollers.

6. The shrimp peeling apparatus of claim 1 wherein said cylindrically-shaped shaft of said roller that is engaged by said drive member is metallic.

7. A shrimp peeling apparatus comprising:

a) a support frame;

b) a first plurality of rollers supported by the frame, wherein the central longitudinal axis of each said roller of said first plurality lies in a common inclined plane;

c) a second plurality of insert rollers supported by the first plurality of rollers;

d) wherein the diameter of each of the first plurality of rollers is much greater than the diameter of each of the second plurality of insert rollers;

e) a drive mechanism for rotating the first plurality of rollers in alternating rotational directions; and f) wherein the drive mechanism includes a cylindrically-shaped metallic shaft of each roller of said first plurality of rollers and a drive member that engages said shaft wherein the drive motor rotates each roller through an angular measurement that varies from one rotation to a subsequent rotation.

8. A shrimp peeling apparatus comprising:

a) a support frame;

b) a first plurality of rollers supported by the frame;

c) a second plurality of insert rollers supported by the first plurality of rollers;

d) wherein the diameter of each of the first plurality of rollers is much greater than the diameter of each of the second plurality of insert rollers;

e) a drive mechanism for rotating the first plurality of rollers in alternating rotational directions; and f) wherein the drive mechanism includes a drive member that rotates each roller through an angular measurement that varies from clockwise to counterclockwise rotation, enabling each roller to advance over time.

9. The shrimp peeling apparatus of claim 8 wherein the drive member includes a flexible main drive belt.

10. The shrimp peeling apparatus of claim 8 wherein the drive member includes a plurality of gear boxes.

11. The shrimp peeling apparatus of claim 8 wherein the drive member includes a vector drive motor.

12. The shrimp peeling apparatus of claim 8 wherein the drive member is a motor drive and there are a plurality of belts extending between adjacent pairs of the larger diameter rollers.

13. A shrimp peeling apparatus comprising:

a) a support frame;

b) a plurality of rollers supported by the frame, wherein rollers next to each other define a nip for peeling shrimp;

c) a drive mechanism for rotating the rollers during peeling;

d) wherein the drive mechanism enables roller rotational direction to reverse during a cyclical rotation of the rollers; and e) wherein the drive mechanism includes a drive member that rotates each roller through a base angular measurement that, can be varied.

14. The shrimp peeling apparatus of claim 13 wherein the drive mechanism includes a vector drive motor.

15. The shrimp peeling apparatus of claim 13 wherein the drive mechanism is computer controlled.

16. The shrimp peeling apparatus of claim 14 wherein the vector drive motor is computer controlled.

17. The shrimp peeling apparatus of claim 13 wherein the drive mechanism includes a motor drive and at least one flexible drive belt.

18. The shrimp peeling apparatus of claim 17 wherein the motor drive is a vector drive motor.

19. The shrimp peeling apparatus of claim 18 wherein the vector drive motor is computer controlled.

20. The shrimp peeling apparatus of claim 13 wherein the drive mechanism enables the speed of rotation to be varied.

21. A shrimp peeling apparatus comprising:

a) a support frame;

b) a plurality of rollers supported by the frame, wherein rollers next to each other define a nip for peeling shrimp;

c) a drive mechanism for rotating the rollers during peeling;

d) wherein the drive mechanism enables roller rotational direction to reverse during a cyclical rotation of the rollers; and e) wherein the drive mechanism includes a drive member that rotates each roller through an angular measurement that varies from clockwise to counterclockwise rotation.

22. The shrimp peeling apparatus of claim 20 wherein the clockwise and counterclockwise rotations differ between 0.25° and 20°.

23. The shrimp peeling apparatus of claim 13 wherein the rollers are inclined.

24. The shrimp peeling apparatus of claim 21 wherein the rollers are inclined.

25. The shrimp peeling apparatus of claim 21 wherein some of the rollers are of a larger diameter and some of the rollers are of a smaller diameter.

26. The shrimp peeling apparatus of claim 21 wherein the drive mechanism includes a gear box.

27. The shrimp peeling apparatus of claim 21 wherein the drive mechanism is computer controlled.

28. The shrimp peeling apparatus of claim 21 wherein the drive mechanism sequentially rotates the plurality of rollers different angular rotational measures so that the rollers are positioned to wear evenly.

29. The shrimp peeling apparatus of claim 25 wherein the drive mechanism sequentially rotates the plurality of larger diameter rollers different angular rotational measures so that the rollers are positioned to wear evenly.

30. The shrimp peeling apparatus of claim 21 wherein the drive mechanism includes a vector drive motor.

31. A shrimp peeling apparatus comprising:
 a) a support frame;
 b) a first plurality of rollers supported by the frame, wherein the central longitudinal axis of each said roller of said first plurality lies in a common inclined plane;
 c) a second plurality of insert rollers supported by the first plurality of rollers;
 d) wherein the diameter of each of the first plurality of rollers is much greater that the diameter of each of the second plurality of insert rollers;
 e) a computer controlled drive mechanism for rotating the first plurality of rollers in alternating rotational directions and through different angular rotational measures for positioning the rollers to wear evenly during use; and
 f) wherein the drive mechanism includes a cylindrically-shaped shaft of each roller and a drive member that engages said cylindrically-shaped shaft.

32. The shrimp peeling apparatus of claim 31 wherein the drive mechanism enables each roller to constantly advance over time.

* * * * *